United States Patent Office 3,786,156
Patented Jan. 15, 1974

3,786,156
METHOD OF TREATING HYPERGLYCEMIA
Ronald H. Rynbrandt and Elisabeth S. Cerda, Portage, and Fredericka L. Schmidt, Kalamazoo, Mich., assignors to The Upjohn Company, Kalamazoo, Mich.
No Drawing. Continuation-in-part of abandoned application Ser. No. 106,601, Jan. 14, 1971. This application Aug. 3, 1972, Ser. No. 277,575
Int. Cl. A61k 27/00
U.S. Cl. 424—305                            7 Claims

ABSTRACT OF THE DISCLOSURE

A method of treating hyperglycemia and more specifically diabetes mellitus in mammals e.g. dogs, cats, horses, and humans, with a unit dosage form of exo-bicycloalkane carboxylic acids and esters thereof of the Formula I:

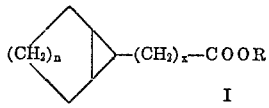

wherein $n$ has the value of 1 to 3, inclusive, wherein $x$ is zero or 1; and wherein R is selected from the group consisting of hydrogen, methyl and ethyl.

CROSS REFERENCE TO RELATED APPLICATION

This application is a continuation-in-part of application Ser. No. 106,601, filed Jan. 14, 1971, now abandoned.

BACKGROUND OF THE INVENTION

Field of the invention

The present invention is concerned with the treatment of hyperglycemia, specifically diabetes mellitus, in mammals with a unit dosage form of compounds and compositions having as active agent a compound of Formula I:

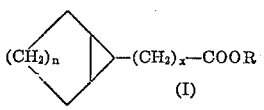

wherein $n$ has the value of 1 to 3, inclusive; wherein $x$ is zero or 1; and wherein R is selected from the group consisting of hydrogen, methyl and ethyl.

These compounds of Formula I, orally administered directly, or in formulations, in unit dosage form, lower the blood sugar in diabetic mammals including man.

PREFERRED EMBODIMENT OF THE INVENTION

The compounds of Formula I herein shown are depicted in the exo configuration, i.e. the chain

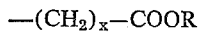

is directed away from the bicycloalkane group. The endo compounds are depicted with the chain

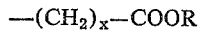

directed toward the bicycloalkane group. As the endo compounds are not orally active antidiabetics, they are not claimed.

The principal cycloalkane moiety

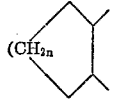

can be cyclopentyl, cyclohexyl, or cycloheptyl, depending on whether $n$ is 1, 2, or 3.

The active compounds herein used are in part disclosed in the art or can be prepared as shown in the art [J. Meinwald et al., J. Am. Chem. Soc. 85, 582–585 (1963)]; or can be prepared as shown below under Preparations.

Preparation 1.—Bicyclo[3.1.0.]hex-2-ene-6-endo carbonaldehyde

To a rapidly stirred suspension of 392 g. (3.7 moles) of anhydrous sodium carbonate in a solution of 276.4 g. (3.0 moles) of bicyclo[2.2.1.]heptadiene in 1.7 l. methylene chloride was added 285 g. of 40% peracetic acid which had been previously treated with 7.4 g. of sodium acetate. The temperature was maintained at about 20° C. during the addition, which required about 2 hours. The reaction mixture was stirred for an additional 2½ hours and allowed to stand overnight. The inorganic solids were filtered off and washed with methylene chloride. The methylene chloride (filtrates and wash) was distilled from the filtrate through a Vigreux column and the residual yellow oil (about 400 ml.) was used directly in the next step.

Preparation 2.—Bicyclo[3.1.0]hex-2-ene-6-endo carboxylic acid

The crude bicyclo[3.1.0.]hex-2-ene-6-endo-carboxaldehyde from the previous step was mixed with 850 g. (5.0 moles) silver nitrate, 2 l. of water and 1 l. of 95% ethanol and stirred vigorously. A solution of 300 g. (7.5 moles) of sodium hydroxide in 4 l. of water was added over a period of 3 hours. The reaction is slightly exothermic. The mixture was allowed to stand overnight and the solids were filtered through Celite (diatomaceous earth) and washed with water. The filtrate was extracted with 3 × 1 l. methylene chloride and the extracts were discarded. The aqueous phase was acidified with 280 ml. of concentrated hydrochloric acid and extracted with 6 × 1 l. of methylene chloride. The extract was dried over anhydrous sodium sulfate and the solvent was removed under vacuum to give 148 g. of yellow crystals. Crystallization from about 800 ml. of Skellysolve B hexanes and Darco activated charcoal gave 131.7 g. of off-white crystals of bicyclo[3.1.0.] hex-2-ene-6-endo-carboxylic acid of melting point 88–91° C. Overall yield (from bicyclo[2.2.1.]heptadiene was 71%.

Preparation 3.—Bicyclo[3.1.0.]hexane-6-endo-carboxylic acid

Bicyclo[3.1.0.]hex-2-ene-6-endo-carboxylic acid (131 g., 1.05 moles) was divided into 5 equal portions (in bottles). Each was dissolved in 200 ml. of absolute ether, 0.5. g. of platinum oxide was added and the solutions were hydrogenated in a Parr hydrogenator at a initial pressure of 50 lbs. until the hydrogen uptake ceased (6–8 minutes). The bottles were allowed to cool, the catalyst was filtered and the combined filtrates were evoporated. The residue was crystallized from 350 ml. of Skellysolve B hexanes to yield 118 g. (89%) of white needles of bicyclo[3.1.0.]hexane-6-endo-carboxylic acid in two crops of melting point 82–85° C.

Bicyclo[3.1.0.]hexane-6-endo-carboxylic acid (18.9 g., 0.15 mole) was added in small portion to an ethereal solution of diazomethane. The reaction mixture was allowed to stand overnight and the excess diazomethane was destroyed by the addition of acetic acid. Half the ether was distilled and the concentrated solution was extracted twice with aqueous sodium bicarbonate followed by saturated salt solution. After drying the ether layer over magnesium sulfate, the solvent was distilled on the steam bath. Distillation of the residue under reduced pressure gave 19.8 g. (94%) of methyl bicyclo[3.1.0.]hexane - 6 - endocarboxylate as a colorless oil of boiling point 71–73° C. at 15 mm. of Hg.

*Analysis.*—Calcd. for $C_8H_{12}O_2$ (percent): C, 68.54; H, 8.63. Found (percent): C, 68.36; H, 8.47.

Preparation 5.—Exo-bicyclo[3.1.0]hexane-6-carboxylic acid

Methyl bicyclo[3.1.0]hexane-6-endo-carboxylate (18.3 g., 0.13 mole) was added to a solution of 9.0 g. (0.39 mole) of sodium in 250 ml. of absolute ethanol and refluxed for 24 hours. The ethanol was distilled and the residue was washed twice with ether. The aqueous phase was acidified with concentrated hydrochloric acid and refrigerated. Yellow crystals separated and were filtered and washed with water. The crude product was dissolved in Skellysolve B hexanes. The organic layer was separated from a small water layer and treated with Darco activated charcoal. The resulting colorless solution was concentrated to ca. 40 ml. and refrigerated to yield 12.4 g. (76%) of exo-bicyclo[3.1.0]hexane-6-carboxylic acid in large colorless plates of melting point 59.5–61.5° C.

Preparation 6.—Exo-bicyclo[3.1.0]hexane-6-acetic acid

Exo-bicyclo[3.1.0]hexane - 6 - formyl chloride (5.8 g. 0.040 mole) was added in small portions over a period of 10 minutes to the well stirred diazomethane solution maintained at 3 to 5° by means of an ice bath. After 30 minutes, stirring was discontinued and the reaction vessel was removed from the ice-bath and allowed to warm to room temperature. An inverted recrystallizing dish was placed over the neck of the flask in order to minimize the loss of diazomethane through evaporation.

The reaction flask was allowed to stand undisturbed for three days in a well ventilated hood. It was then transferred to a beaker and the solution allowed to evaporate. The crude residue thus obtained was shown to contain the desired diazoketone by its infrared and NMR spectra. It was subjected to a Wolff rearrangement without purification.

The well stirred solution of the crude diazoketone in absolute methanol (300 ml.) at room temperature was treated with a freshly prepared solution of silver benzoate (3.0 g.) in triethylamine (30 ml.). Bubbles of gas were almost immediately emitted. When the bubbling subsided additional silver benzoate solution (1 g. of silver benzoate in 10 ml. of triethylamine) was added. Stirring was continued for one hour and then the reaction mixture was allowed to stand for several days. It was then filtered through a pad of diatomaceous earth (Celite) and concentrated in vacuo to a viscous brown oil. This was dissolved in ether (400 ml.) and washed successively with water (2× 250 ml.), 1 N hydrochloric acid (2× 250 ml.) and finally with aqueous saturated sodium bicarbonate (2× 400 ml.). The ether solution was dried over anhydrous magnesium sulfate. This was concentrated in vacuo to a red oil which, when subjected to vacuum distillation, gave 1.96 g. (32% overall yield) of methyl exo-bicyclo[3.1.0]hexane-6-acetate as a pale green oil of boiling point 70° C. at 3.0 mm. Hg.

The above ester (1.96 g.; 0.013 mole) was dissolved in ethanol (10 ml.) and heated under gentle reflux with rapid stirring for two hours. After cooling to room temperature, the reaction mixture was diluted with water (200 ml.) and washed with ether (2× 200 ml.). The aqueous layer was then acidified with 2.5 N sulfuric acid and the resultant suspended oil extracted with ether (2× 150 ml.). The combined ether extracts were dried overnight over anhydrous magnesium sulfate. Concentration in vacuo gave a nearly colorless, clear oil (1.4 g.). Vacuum distillation of this oil gave 1.05 g. (58% yield) of exo-bicyclo[3.1.0]hexane-6-acetic acid as a clear, colorless, noncrystallizable liquid, of boiling point 82° C. at 0.1 mm. Hg. The yield over all steps from the acid chloride was 18.5%.

*Analysis.*—Calcd. for $C_8H_{12}O_2$ (percent): C, 68.54; H, 8.63. Found (percent): C, 68.25; H, 8.53.

The thus produced carboxylic acids are converted by conventional procedures with thionyl chloride or thionyl bromide, to the acid halides of Formula I, used as starting materials.

Exo-bicyclo[4.1.0]heptane - 7 - carboxylic acid (exo-7-norcaranecarboxylic acid) of melting point 98–99° C. and exo-bicyclo[5.1.0]octane-8-carboxylic acid boiling point 115–127° C. at 2 mm. Hg are known. The analogous acetic acid compounds of these compounds can be prepared as shown for the bicyclohexanecarboxylic acid in Preparation 6.

The esters of these bicycloalkane carboxylic acid products can be produced by reacting a selected acid chloride or bromide with the alcohol. For methyl esters, in particular, the acid can be reacted with diazomethane. Preparations 7 and 8 exemplify the esterification.

Preparation 7.—Methyl exo-bicyclo[3.1.0] hexane-6-carboxylate

Bicyclo[3.1.0]hexane-6-endo-carboxylic acid (18.9 g. 0.15 mole) was added in small portion to an ethereal solution of diazomethane. The reaction mixture was allowed to stand overnight and the excess diazomethane was destroyed by the addition of acetic acid. Half the ether was distilled and the concentrated solution was extracted twice with aqueous sodium bicarbonate followed by saturated salt solution. After drying the ether layer over magnesium sulfate, the solvent was distilled on the steam bath. Distillation of the residue under reduced pressure gave methyl exo-bicyclo[3.1.0]hexane-6-carboxylate of boiling point 70–75° at 15 mm. of Hg.

Preparation 8.—Ethyl exo-bicyclo[3.1.0] hexane-6-carboxylate

Exo-bicyclo[3.1.0]hexane-6-formyl chloride (11.4 g.; 0.079 mole) was added slowly to a stirred solution of 0.079 mole ethanol and pyridine (6.25 g.; 0.079 mole), dissolved in carbon tetrachloride (100 ml.), maintained at 5 to 10° via an ice bath. Upon completion of addition of the acid chloride, the reaction mixture was allowed to warm to room temperature over a period of 1½ hrs. with continuous stirring. It was then combined with an equal volume of water, shaken well, and the layers separated. The organic layer was washed successively with saturated aqueous ammonium chloride (150 ml.) and saturated sodium bicarbonate (150 ml.) and then dried over anhydrous sodium sulfate. Concentration in vacuo gave a light yellow oil which was subjected to vacuum distillation. Redistillation of the vacuum distillate gave 9.5 g. of ethyl exo-bicyclo[3.1.0]hexane-6-carboxylate of boiling point 55–57° C. at 3 mm. Hg.

It was now discovered, that such esters and free acids as shown above, are useful in the peroral treatment of diabetes mellitus.

In the past diabetes has been alleviated primarily by the use of insulin. Unfortunately, however, insulin cannot be given orally. Thus, the diabetics before the advent of sulfonylurea therapy for the rteatment of diabetes were faced with a lifetime of insulin injections necessary for the maintenance of bodily health. The novel methods of the present invention provide a means for the relief of diabetes without the necessity of injections. The novel methods and compositions are not only capable of reducing blood sugar to a safe level for a considerable period of time but, in addition, also bring about satisfactory blood-sugar reduction at low dosage levels. The compounds of the present invention are longer acting than tolbutamide the well known oral antidiabetic agent.

For example, for tolbutamide the lowest doses with consistent hypoglycemic activity is about 25 mg./kg. in rats whereas exo-bicyclo[3.1.0]hexane-6-carboxylic acid and its ethyl ester exhibits the same activity at 6.25 mg./kg., exo-bicyclo[4.1.0]heptane-7-carboxylic acid at 2.0 mg./kg. and exo-bicyclo[3.1.0]hexane-6-acetic acid at 12.5 mg.

Pharmaceutically effective unit dosages therefore range from about 2–200 mg. per kg. in mammals. Mammals herein include mainly domestic and farm animals, e.g. dogs, cats, horses, cattle, swine, goats, and man.

All blood sugar determinations were made according to the following procedure:

Glucose-primed, fasted (18–24 hrs.), intact male rats are the test animal. The test compound is administered orally at various dosages in 0.5 cc. sterile vehicle (6 rats/group). Immediately following administration of the test material, the animals are injected subcutaneously with 125 mg. of glucose in 1 ml. of 0.9% saline. Two hours later the rats are bled, via the vena cava, while under Cyclopal anesthesia, and the blood sugar determined. A significant depression of blood sugar from that of controls indicates activity.

For such oral administration the active compounds can be administered in liquid or solid dosage forms. Solid forms include capsules, tablets, powders, pills, dragées and the like, and liquid forms include suitably flavored aqueous suspensions and solutions (depending on concentration desired), and flavored oil suspensions and solutions wherein edible oils, e.g., corn oil, cottonseed oil, coconut oil, peanut oil, sesame oil, sunflower seed oil, or mixtures of these and the like can be employed.

For preparing compositions such as tablets and other compressed formulations the composition can include any compatible and edible tableting material used in pharmaceutical practice, e.g., corn starch, lactose, stearic acid, magnesium stearate, talc, methyl cellulose, and the like.

Similarly, the compounds of the present invention can be mixed with suitable adjuvants for the preparation of resorbable hard gelatin or soft gelatin capsules utilizing conventional pharmaceutical practices.

The following illustrative compositions are within the scope of the present invention:

Example 1. Hard gelatin capsules.—10,000 two-piece hard gelatin capsules for oral use, each containing 200 milligrams of active ethyl exo-bicyclo[3.1.0]hexane-6-carboxylate are prepared from the following amounts and types of materials:

| | Gm. |
|---|---|
| Ethyl exo-bicyclo[3.1.0]hexane-6-carboxylate | 2000 |
| Corn starch | 1616 |
| Mineral oil, U.S.P. | 129.6 |
| Magnesium stearate, powder | 162 |
| Talc, U.S.P. | 162 |

The finely powdered microencapsulated, ethyl exo-bicyclo[3.1.0]hexane-6-carboxylate is thoroughly mixed with the rest of the ingredients and then capsulated.

Example 2. Soft elastic capsules.—One piece soft elastic capsules for oral use, each containing 100 milligrams of exo-bicyclo[3.1.0]hexane-6-carboxylic acid are prepared in the usual manner by first dispersing the active ingredient in sufficient corn oil to render the material capsulatable. 1 to 4 capsules daily are administered from 1 to 4 times to the diabetic patient.

Example 3. Oil suspension.—An oil suspension for oral use containing in each 5 milliliters 50 milligrams of exo-bicyclo[4.1.0]heptane-7-carboxylic acid is prepared from the following types and amounts of materials:

| | | |
|---|---|---|
| Sweetening agent | gm | 3.5 |
| Exo-bicyclo[4.1.0]heptane-7-carboxylic acid | gm | 100 |
| Preservative | gm | 20 |
| Antioxidant | gm | 1 |
| Flavoring | ml | 25 |
| Aluminum monostearate-corn oil gel, q.s. to 10,000 ml. | | |

Five to 15 ml. of this suspension is administered from 1 to 4 times daily to a diabetic patient.

Example 4. Tablets.—10,000 oral tablets each containing 500 milligrams of methyl exo-bicyclo[5.1.0]octane-8-carboxylate are prepared from the following types and amounts of materials:

| | Gm. |
|---|---|
| Methyl exo-bicyclo[5.1.0]octane - 8 - carboxylate (Microencapsulated) powder | 5000 |
| Dicalcium phosphate | 3050 |
| Methylcellulose, U.S.P. (15 cps.) | 65 |
| Talc, bolted | 450 |
| Calcium stearate, fine powder | 35 |

The ingredients are mixed in a conventional manner and compressed into tablets, each containing 500 mg. of active ingredient.

In the same manner, but in quantities proportional to their activity, tablets containing 30 mg. and 100 mg. of methyl or ethyl exo-bicyclo[3.1.0]hexane-6-carboxylate can be prepared.

Tablets are generally given from 1 to 5 times daily to the diabetic patient.

Example 5. Syrup.—A sugar-free syrup for oral use containing in each 5 milliliters 50 milligrams exo-bicyclo[3.1.0]hexane-6-acetic acid is prepared from the following types and amounts of materials:

| | | |
|---|---|---|
| Exo-bicyclo[3.1.0]hexane-6-acetic acid | gm | 100 |
| Methylparaben, U.S.P. | gm | 3 |
| Sorbic acid | gm | 3 |
| Sweetening agent | gm | 18 |
| Flavoring | ml | 3 |
| Glycerin | ml | 1500 |
| Deionized water q.s. to 10,000 ml. | | |

A dose of 1 teaspoonful (5 ml.) to 1 tablespoonful (15 ml.) will give the diabetic patient 50 to 150 mg. of exo-bicyclo[3.1.0.]hexane-6-acetic acid. One to 3 times daily administration of the above suspension is used for the treatment of diabetes.

The dosage of the novel compounds of the present invention for the treatment of diabetes depends on the age, weight, and condition of the patient being treated. Generally speaking for adult oral administration the preferred systemic pharmaceutical dosage unit is 25 to 1000 mg. of active compound with a suitable pharmaceutical diluent and/or lubricant. One or two unit dosages are given one to four times a day. A total daily dose of from 25 to 4000 mg. given singly but preferably in divided doses, embraces the effective range for the treatment of diabetes.

In addition to the foregoing principal active ingredients, the present compositions can also include, as supplementary active ingredients, other blood-sugar lowering compounds, such as tolbutamide, chloropropamide and phenformin. Such supplementary active ingredients can be included in these compositions in amounts approximately equal to or less than the concentrations employed when each material is the sole active ingredient.

Example 6.—Hard capsules (10,000) are filled with a mixture as follows:

| | Gm. |
|---|---|
| Exo-bicyclo[4.1.0.]heptane - 7 - carboxylic acid microencapsulated, powder | 500 |
| Tolbutamide | 2500 |
| Mineral oil | 129.6 |
| Corn starch | 1616 |
| Magnesium stearate, powdered | 162 |
| Talc, U.S.P. | 162 |

A dosage of 2 to 6 capsules per day in 1 to 3 administration is used for diabetes.

The tolbutamide in Example 6 can be replaced by phenformin, tolazamide and the like.

We claim:

1. An oral pharmaceutical composition in unit dosage form comprising an effective nontoxic amount for antihyperglycemic effects of a compound of the formula:

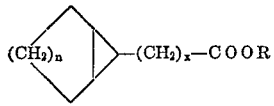

wherein $n$ has the value of 1 or 2, inclusive; wherein $x$ is zero or 1; and wherein R is hydrogen, or ethyl, in a pharmacologically acceptable carrier.

2. A method of obtaining blood sugar lowering effects in a mammal suffering from hyperglycemia which consists essentially of administering orally to said mammal in a pharmaceutical dosage unit about 2 mg. per kg. to about 200 mg. per kg. of weight of the mammal of a compound of the formula:

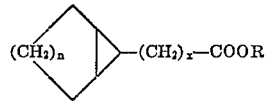

wherein $n$ has the value of 1 or 2, inclusive; wherein $x$ is zero or 1; and wherein R is hydrogen or ethyl.

3. The method of claim 2, wherein the mammals are humans.

4. The method of claim 2, wherein the active compound is exo-bicyclo[3.1.0.]hexane-6-carboxylic acid.

5. The method of claim 2, wherein the active compound is exo-bicyclo[4.1.0.]heptane-7-carboxylic acid.

6. The method of claim 2, wherein the active compound is ethyl exo-bicyclo[3.1.0.]hexane-6-carboxylate.

7. The method of claim 2, wherein the active compound is exo-bicyclo[3.1.0.]hexane-6-acetic acid.

References Cited

J. Am. Chem. Soc., 85, 582–585 (1963).

The Pharmacological Basis of Therapeutics—The Masmillan Co., New York (1965), pp. 1594–1595.

ALBERT T. MEYERS, Primary Examiner

F. E. WADDELL, Assistant Examiner

U.S. Cl. X.R.

424—311, 317